May 14, 1946.                A. WOLF                 2,400,326
                    ELECTRICAL MEASURING INSTRUMENT
                        Filed Sept. 30, 1943
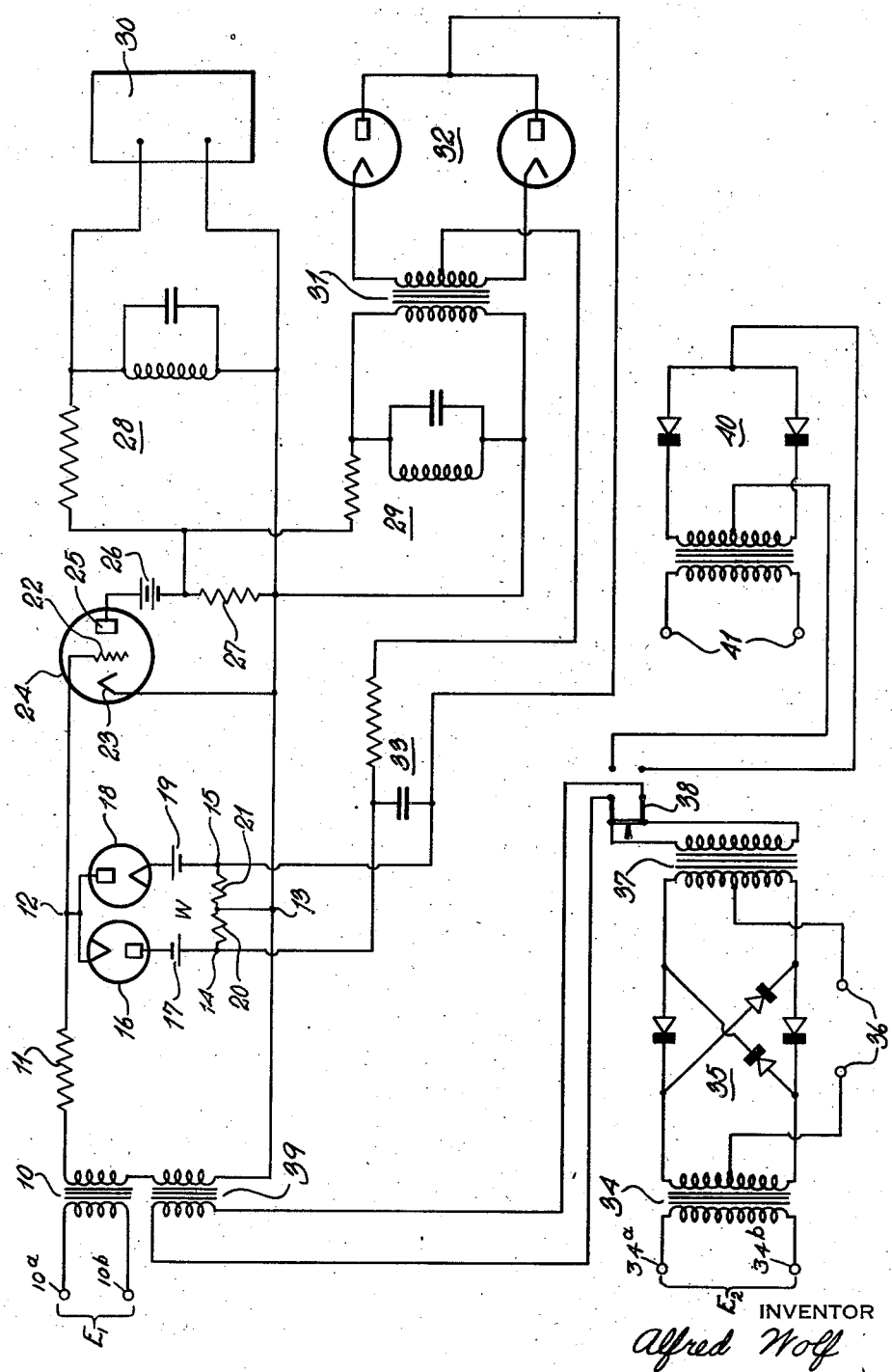
INVENTOR
Alfred Wolf
BY
ATTORNEYS Patented May 14, 1946

2,400,326

UNITED STATES PATENT OFFICE 2,400,326

ELECTRICAL MEASURING INSTRUMENT

Alfred Wolf, Tulsa, Okla., assignor to Geophysical Research Corporation, New York, N. Y., a corporation of New Jersey Application September 30, 1943, Serial No. 504,397

4 Claims. (Cl. 171—95)

This invention relates to electrical measuring instruments.

An object of this invention is an instrument for measuring the ratio of two alternating current voltages of the same frequency.

In general, the measuring instrument comprises a vacuum tube amplifier of the automatic volume control type in conjunction with a frequency changer. The output voltage of the amplifier is impressed upon two filters, the first of which is tuned to pass only one frequency and the other of which is tuned to pass only a frequency other than said one frequency. The first filter is connected to a voltage responsive registering instrument while the second filter, through suitable rectifying means, supplies direct current voltage for controlling the attenuator element of the amplifier. The frequency changer has its output connected to the input of the amplifier. The alternating current voltages of the same given frequency are fed one to the amplifier input and the other to the frequency changer output and the first filter is tuned to pass only said given frequency. The frequency changer changes the second voltage to the frequency passed by the second filter so that one voltage is impressed on the amplifier at the frequency passed by the first filter and the other voltage is impressed on the amplifier at the frequency passed by the second filter. The attenuator element of the amplifier is controlled only by rectified voltage of the frequency passed by the second filter with the result that the amount of attenuation effected by the attenuator is proportional to the impressed alternating current voltage of that frequency. The voltage reaching the registering instrument is proportional to the impressed voltage of the frequency passed by the first filter and is attenuated by an amount proportional to the impressed voltage of the frequency passed by the second filter with the result that the register indicates the ratio between the two voltages.

Other objects, novel features and advantages of this invention will become apparent from the following specification and accompanying drawing, wherein the single figure is a circuit diagram of an embodiment of the invention.

In the drawing, 10 designates a transformer having primary terminals 10a and 10b, the secondary of which feeds into an attenuator consisting of a resistance 11 in series with a Wheatstone bridge circuit W having terminals 12, 13, 14 and 15. One arm of the circuit W contains a vacuum tube rectifier 16 and a battery 17 while a second arm contains a vacuum tube rectifier 18 and a battery 19 and the two remaining arms respectively contain the resistors 20 and 21. The direction of permissible current flow through the rectifier 16 is from the terminal 13 to terminal 12 while the direction of permissible current flow through the rectifier 18 is from the terminal 12 to the terminal 13. The two rectifiers 16 and 18 together with the resistors 20 and 21 constitute a variable resistance which is a function of direct current voltage applied to the terminals 14 and 15. The direct current voltage for controlling the value of the resistance just referred to is degenerative direct current voltage obtained from a source later to be described. The voltage of the batteries 17 and 19 is usually made sufficiently great that no current flows through the rectifiers when the direct current voltage applied between the terminals 14 and 15 is zero. Under these circumstances, the alternating current voltage drop across the circuit W has the same amplitude as the alternating current voltage induced in the secondary of the transformer 10. Upon application of direct current voltage between the terminals 14 and 15 in such a direction as to overcome the polarized voltages of the batteries 17 and 19 and make the rectifiers 16 and 18 conductive, the alternating current voltage drop across the circuit W becomes smaller than the alternating current voltage induced in the secondary of the transformer 10. The value of the attenuation thus obtained is the ratio of the resistance W to the sum of the resistances 11 and W. By making the resistance 11 sufficiently great the attenuation ratio can be made very large.

The voltage drop across the circuit W is impressed between the control electrode 22 and the cathode 23 of a vacuum tube amplifier 24. The anode 25 of the amplifier is connected to the cathode through a battery 26 and a resistance 27. The voltage drop across the resistance 27 is impressed upon a filter 28 and upon a filter 29. The filter 28 is tuned to pass only one frequency while the filter 29 is tuned to pass another frequency different from said one frequency. The output of the filter 28 is fed to a voltage responsive registering instrument such, for example, as a recorder 30.

The output of the filter 29 is fed to the primary of a transformer 31, the secondary of which constitutes part of the input circuit of a full wave rectifier 32. The output of the rectifier 32 is fed through a resistance-condenser network 33 to the terminals 14 and 15 of the circuit W. A transformer 34 having primary terminals 34a and 34b has its secondary forming part of a circuit 35 which constitutes a balanced modulator employed as a frequency changer as described by R. S. Caruthers, Bell System Technical Journal, volume 18, April 1939. Carrier frequency is supplied to the modulator at the terminals 36. The output of the circuit 35 is fed through a transformer 37 and switch 38 to the primary of a transformer 39, the secondary of which is connected in series with the secondary of the transformer 10.

In the operation of the above-described circuit to measure the ratio of two voltages $E_1$ and $E_2$ of the same frequency $f_1$, voltage $E_1$ is impressed upon the primary of the transformer 10 and voltage $E_2$ is impressed upon the primary of the transformer 34. The voltage $E_1$ at frequency $f_1$ is fed directly into the attenuator. The voltage $E_2$ is changed from frequency $f_1$ to frequency $f_2$ by the balanced modulator 35 through the action of the carrier frequency voltage supplied to the terminals 36. The voltage $E_2$ at frequency $f_2$ is then fed into the attenuator. The filter 28 is tuned to pass frequency $f_1$ and reject frequency $f_2$ while the filter 29 is tuned to pass the frequency $f_2$ and reject the frequency $f_1$. The output from the filter 28 is fed into the recorder 30 while the output from the filter 29 is rectified and degenerative direct current voltage thus obtained is impressed between the terminals 14 and 15 of the circuit W. The elements of the circuit W are such that the direct current voltage supplied between the terminals 14 and 15 controls the frequency $f_2$ voltage between the grid and cathode of the amplifier 24 in such manner that a change in the voltage impressed on the transformer 39 produces no change in the $f_2$ frequency output voltage of the amplifier. The circuit consisting of the attenuator, amplifier, filter 29 and rectifier 32 constitute in effect an automatic volume control amplifier for voltages of frequency $f_2$. The attenuation effect on the $f_2$ frequency voltage is therefore proportional to the $E_2$ voltage impressed on the transformer 39. Consequently, the attenuation effected by the attenuator on the $E_1$ voltage impressed on the transformer 10 is proportional to the $E_2$ voltage. As a result, the $f_1$ frequency output of the amplifier 24 is inversely proportional to the $E_2$ voltage so that the recorder 30 registers the ratio of voltage $E_1$ to the voltage $E_2$.

The frequency of voltage $E_2$ may be changed by use of a frequency doubler 40. The $E_2$ voltage at frequency $f_1$ is impressed upon the input terminals 41 of the frequency doubler 40 and the output voltage $E_2$ at frequency $2f_1$ is impressed on the primary of the transformer 39. When the frequency doubler is used, the switch 38 is operated to disconnect the balanced modulator 35 from the transformer 39 and connect the frequency doubler 40 to the transformer 39 instead.

It is of course understood that other modifications may be made in the device above described without in any way departing from the spirit of the invention as defined in the appended claims.

I claim:

1. A device for measuring the ratio of two alternating current voltages of the same given frequency comprising an alternating current voltage attenuator controlled by impressing direct current voltage thereon, a frequency changer having its output connected to the input of said attenuator, a vacuum tube amplifier having its input connected to the output of said attenuator, a first filter connected to said amplifier output and capable of passing said given frequency only, a register connected to said first filter, a second filter connected to the amplifier output and capable of passing said frequency changer output while rejecting said given frequency, means for rectifying the output of said second filter and impressing the rectified output on said attenuator to control its attenuating effect on the alternating current voltage supplied thereto, means for impressing one of said voltages on the input of said attenuator and means for impressing the other of said voltages on the input of said frequency changer.

2. A device for measuring the ratio of two alternating current voltages of the same given frequency comprising an alternating current voltage attenuator controlled by impressing direct current voltage thereon, a frequency changer having its output connected to the input of said attenuator, a vacuum tube amplifier having its input connected to the output of said attenuator, a first filter connected to said amplifier output and capable of passing said given frequency only, voltage responsive means connected to said first filter, a second filter connected to the amplifier output and capable of passing said frequency changer output while rejecting said given frequency, means for rectifying the output of said second filter and impressing the rectified output on said attenuator to control its attenuating effect on the alternating current voltage supplied thereto, means for impressing one of said voltages on the input of said attenuator and means for impressing the other of said voltages on the input of said frequency changer.

3. A device according to claim 1 in which said attenuator is of the variable impedance type.

4. A device according to claim 2 in which said attenuator is of the variable impedance type.

ALFRED WOLF.